United States Patent [19]

Laventure

[11] Patent Number: 5,427,624
[45] Date of Patent: Jun. 27, 1995

[54] METHOD OF USING A DUSTER EXTENSION TUBE SYSTEM WITH TUBE CLEANER

[76] Inventor: David Laventure, 97 Highview Ter., Manchester, N.H. 03104

[21] Appl. No.: 81,616

[22] Filed: Jun. 23, 1993

[51] Int. Cl.⁶ .................... B08B 9/02; B08B 1/00; B05B 11/04
[52] U.S. Cl. ........................ 134/8; 239/114; 239/123; 239/154; 239/390; 239/536; 239/DIG. 13; 222/633
[58] Field of Search ............... 239/114, 115, 116, 117, 239/120, 152, 154, 536, DIG. 13, 123, 390, 532, 588; 222/206, 215, 567, 631–633; 15/104.2; 134/8

[56] References Cited

U.S. PATENT DOCUMENTS

| | | | |
|---|---|---|---|
| 128,570 | 7/1872 | Wallace. | |
| 129,167 | 7/1872 | Reynard | 222/633 |
| 362,254 | 5/1887 | Deverall. | |
| 600,547 | 3/1898 | Mazzanovich | 222/633 |
| 2,098,128 | 11/1937 | Bailey | 221/32 |
| 2,336,873 | 12/1943 | Lindberg | 43/147 |
| 2,780,492 | 2/1957 | Stine | 239/123 X |
| 2,953,285 | 9/1960 | McKelvey | 222/567 |
| 3,142,421 | 7/1964 | Sieracki | 222/567 X |
| 3,399,837 | 9/1968 | Frick | 239/415 |
| 3,459,344 | 8/1969 | Mackey | 222/479 |
| 3,700,174 | 10/1972 | Beck | 239/532 X |
| 3,768,109 | 10/1973 | Wardell | 15/104.2 X |
| 4,089,441 | 5/1978 | Cole et al. | 239/154 X |
| 4,258,884 | 3/1981 | Rogers | 239/390 |
| 4,553,698 | 11/1985 | Parker et al. | 239/3 |
| 4,728,007 | 3/1988 | Samuelson et al. | 222/182 |
| 5,035,796 | 7/1991 | Saylor et al. | 239/123 X |
| 5,065,913 | 11/1991 | Glasener | 222/528 |
| 5,154,323 | 10/1992 | Query et al. | 239/588 X |

*Primary Examiner*—William Grant
*Attorney, Agent, or Firm*—Daniel J. Bourque; Anthony G. M. Davis; Michael Bujold

[57] ABSTRACT

An extension tube system for a dust particulate dispenser and a method of using the extension tube system are disclosed. The system includes a flexible duster extension tube having a central body portion with a first diameter, a first coupling end with a larger diameter, and a second dispensing end with a smaller diameter. The first coupling end is inserted over an outlet region of a dust particulate dispenser. Additional extension tubes can be connected to the second dispensing end of an extension tube to extend the reach to an area where dust particulates must be applied. A flexible duster extension tube cleaner having a cleaning element is used to clean remaining dust particulates from within the extension tubes. After the dust particulates are dispensed through the extension tube system, each extension tube is disconnected, and the tube cleaner is gripped at one end so that the cleaning element at the other end can be inserted into each flexible duster extension tube. The cleaning element is moved within each extension tube and any remaining dust particulates are expelled into a recovery container so that they may be reused or properly disposed of.

2 Claims, 1 Drawing Sheet

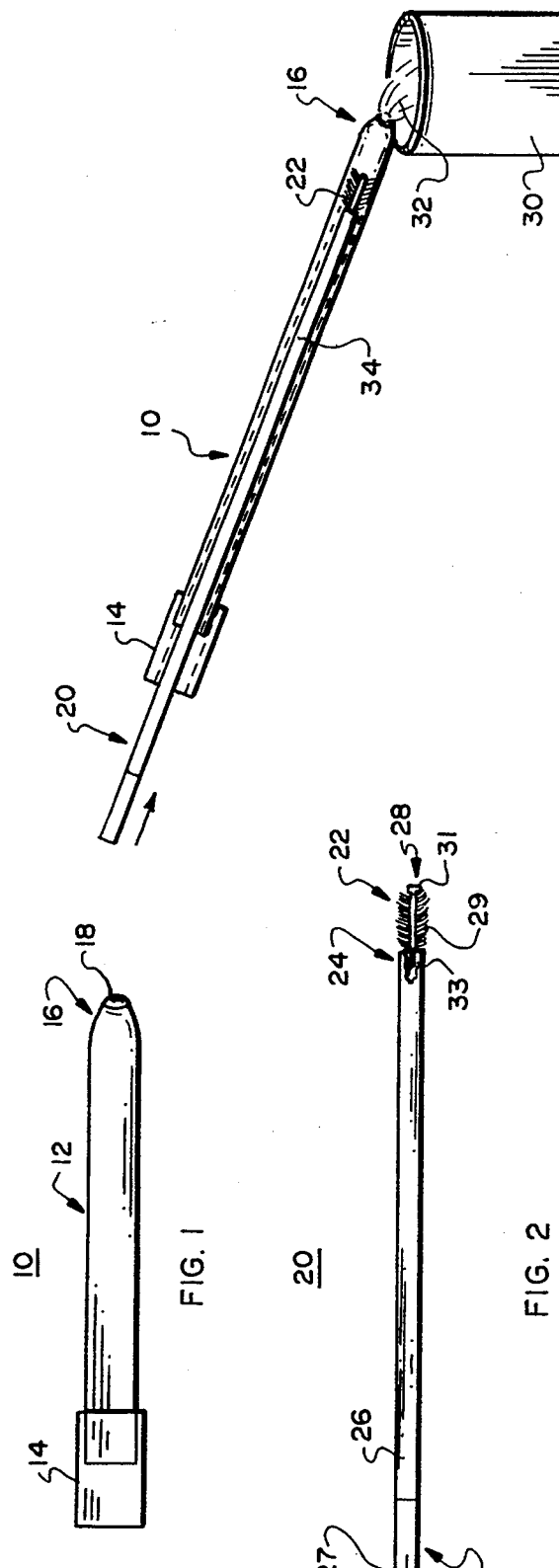
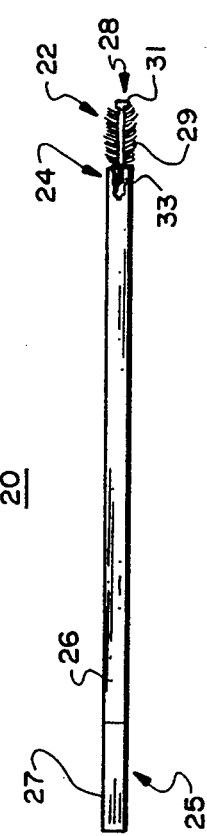
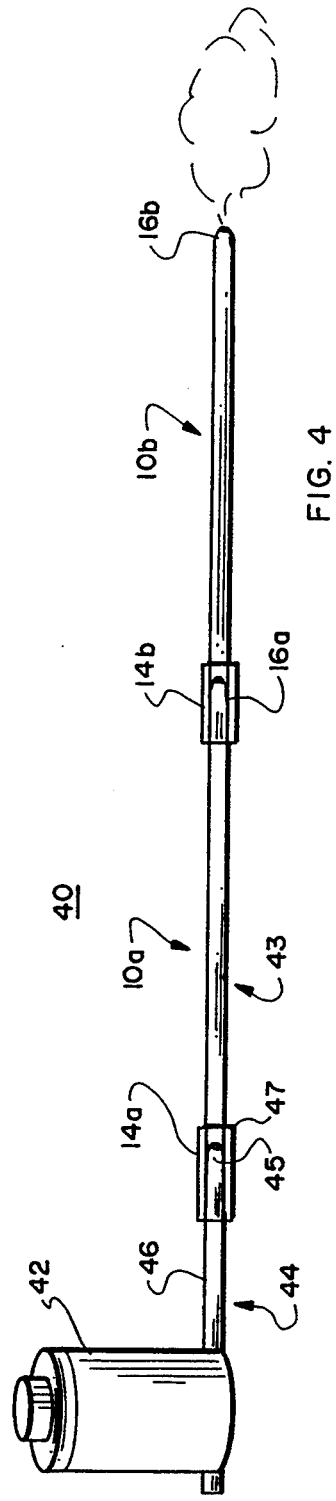

METHOD OF USING A DUSTER EXTENSION TUBE SYSTEM WITH TUBE CLEANER

FIELD OF THE INVENTION

This invention relates to a dust dispensing system and in particular, to a flexible extension tube including a tube cleaner for a dust dispenser, and to a method for using the extension tube system and tube cleaner.

BACKGROUND OF THE INVENTION

Squeeze type duster dispensers such as bellows dusters are well known in the pest control industry. One such duster is a "Gettes" duster which typically has a short dispensing tube for dispensing pesticide dust to the desired area. Applying or dispensing the pesticide dust involves bending over with the duster to reach low areas such as along the baseboards of a house, or climbing to reach high areas along the ceiling.

An extension tube system can be used to eliminate the difficulty of applying pesticide dust to these hard to reach areas. While the use of flexible extension tubes will extend the reach of the dust dispenser, problems still remain because, after pesticide dust has been dispensed, some of the dust remains in the extension tubes. As a result, there is an undesirable risk of mixing different types of pesticide dusts within the tubes and of not properly disposing of the remaining pesticide as required by law. Additionally, one fixed length extension tube may not always be sufficient to ready the desired area.

Some of the dispensers shown in the prior art disclose a single flexible tube attached to the dispensers. For example, U.S. Pat. No. 4,553,698 discloses a pneumatic pesticide duster with a single flexible outlet tube of sufficient length to treat pest harborages. U.S. Pat. No. 2,336,873 discloses an insecticide dispenser attached to a single flexible hose. However, the long flexible tubes of these prior art dispensers contain dust particulates after use, and the prior art does not provide for the cleaning of the tubes to remove pesticide or insecticide.

Accordingly, what is needed is a duster extension tube system with interconnecting extension tubes and a tube cleaner for removing the pesticide dust which remains inside the extension tubes. Such duster extension tube system with interconnecting extension tubes can be used to construct an extension of sufficient length to reach difficult areas. The tube cleaner can then be used to clean the individual extension tubes when they are disconnected. The tube cleaner will allow the extra dust to be saved and properly disposed of as required by law, and will prevent mixing different types of pesticide dusts within the tubes.

SUMMARY OF THE INVENTION

The present invention is an extension tube system for a dust particulate dispenser and a method of using the extension tube system. The present extension tube system includes at least one flexible duster extension tube which is made from a flexible material, such as a flexible plastic or acrylic. Each flexible duster extension tube has a predetermined length, a first end, a central body portion, and a second end. The first end is removably engageable with an outlet region of a dust particulate dispenser or another extension tube, while the second end includes a dust particulate dispensing region.

In the preferred embodiment, the first end includes a short piece of soft acrylic or rubber hose which has a diameter which is larger than the diameter of the central body portion of the extension tube, and the second end has a diameter smaller than the diameter of the central body portion. The second end of the flexible duster extension tube is tapered from the diameter of the central body portion to a slightly smaller diameter to form the dust particulate dispensing region.

The extension tube system of the present invention also includes a flexible duster extension tube cleaner having a predetermined length which is longer than the predetermined length of the flexible duster extension tube. The flexible duster extension tube cleaner has a flexible duster extension tube cleaning element proximate a first end of the tube cleaner and a gripping portion at the second end of the tube cleaner. The flexible duster extension tube cleaning element is adapted for insertion into the first end of the flexible duster extension tube and for moving within the flexible duster extension tube from the first end toward the second end to cause dust particulates remaining in the flexible duster extension tube to be expelled from the second end.

The present invention also includes a method of using an extension tube system for a dust particulate dispenser. A first end of a flexible duster extension tube is first interconnected with an outlet region of a dust particulate dispenser. In the preferred embodiment, the first end of the flexible duster extension tube is inserted over an outlet region of the dust particulate dispenser and interlocks with the outlet region. Dust particulates are then dispensed through the flexible duster extension tube to a desired area.

The first end of the flexible duster extension tube is then removed from the outlet region of the dust particulate dispenser. A flexible duster extension tube cleaner is inserted into the first end of the flexible duster extension tube and moved from the first end of the flexible duster extension tube toward the second end, to expel any remaining dust particulates from the flexible duster extension tube. In the preferred method, the remaining dust particulates are expelled into a dust recovery container, such as the original dust particulate container.

The method of the present invention also includes interconnecting a plurality of flexible duster extension tubes to extend the reach of the dust particulate dispenser. The first end of one or more additional flexible duster extension tubes are interconnected and interlock with the second end of a flexible duster extension tube already attached to the outlet region of the dust particulate dispenser. Any number of flexible duster extension tubes can thus be interconnected in this manner to extend the reach and dispense dust in a desired area.

After removing the flexible duster extension tube from the outlet region, the plurality of flexible duster extension tubes are disconnected. Then the flexible duster extension tube cleaner is inserted into the first end of each of the flexible duster extension tubes and moved toward the second end of each flexible duster extension tube to expel any remaining dust particulates.

DESCRIPTION OF THE DRAWINGS

These, and other features and advantages of the present invention will be better understood by reading the following detailed description, taken together with the drawings wherein:

FIG. 1 is a perspective view of the flexible duster extension tube according to the present invention;

FIG. 2 is a perspective view of the flexible duster extension tube cleaner according to the present invention;

FIG. 3 is a cross-sectional illustration of the present invention showing the flexible duster extension tube cleaner within the flexible duster extension tube to remove dust particulates; and FIG. 4 is a perspective view of a dust particulate dispenser with the assembled flexible duster extension tube system according to the present invention.

DETAILED DESCRIPTION OF THE INVENTION

The present invention of a duster extension tube system includes one or more flexible duster extension tubes 10, FIG. 1. The flexible duster extension tube 10 has an elongated central body portion 12, a first coupling end 14, and a second dispensing end 16. The flexible duster extension tube 10 typically has a predetermined length of approximately 20 inches and is made of a flexible material, such as a flexible plastic or acrylic.

The first or coupling end 14 of the flexible duster extension tube 10 is preferably a short (approximately 15 inches) piece of soft acrylic or similar piece of tubing which is adapted to be interconnected with an outlet of a dust particulate dispenser such as a "Gettes" duster, or to another extension tube as will be described in greater detail below.

In the preferred embodiment, the flexible duster extension tube 10 has a first diameter (inside diameter) in the area of the central body portion 12 which is typically about 5/16 inches and a second diameter proximate the first coupling end 14 which is larger than the first diameter. The second diameter at the first coupling end 14 is typically about ⅜ inches, or large enough to fit over the extension tube 12. In this preferred embodiment, the first coupling end 14 with the larger diameter is adapted to be inserted over and interlock with a tapered outlet tube of the duster or over a dispensing end of another extension tube having a diameter smaller than the diameter of the first coupling end 14.

The second or dispensing end 16 of the flexible duster extension tube 10 includes a dust particulate dispensing region 18 for dispensing pesticide dust to a desired area or into another extension tube attached to the second dispensing end 16. In the preferred embodiment shown in FIG. 1, the flexible duster extension tube 10 has a third diameter at the second dispensing end 16 which is somewhat smaller than the first diameter of the central body portion 12. The third diameter at the second dispensing end 16 is typically about 3/16 inches.

The duster extension tube system of the present invention further includes a flexible duster extension tube cleaner 20, FIG. 2. The tube cleaner 20 includes a cleaning element 22 proximate a first end 24 of the tube cleaner 20. In one embodiment, the cleaning element 22 is formed by a screw 28 which has been wrapped about a first end 31 with a pipe cleaner 29. The second end 33 of the screw 28 is screwed into an elongated rod 26, preferably a wooden dowel.

A second end 25 of the tube cleaner 20 has a gripping region 27 for holding the tube cleaner and inserting the cleaning element into a flexible duster extension tube. The tube cleaner has a predetermined length which is longer than the predetermined length of the flexible duster extension tube 10 and is typically about 23 inches. The tube cleaner 20 has a diameter slightly smaller than the extension tube, and thus allows the tube cleaner 20 to slide within the flexible duster extension tube so that the cleaning element 22 will expel dust particulates from the inside surface 34 of the extension tube, as shown in FIG. 3. The tube cleaner diameter is typically about ¼ inches.

The method of using the flexible extension tube system is illustrated in FIGS. 3 and 4 wherein a single flexible duster extension tube 10a, FIG. 4, can be interconnected with a dust dispenser 42 for dispensing dust. The flexible duster extension tube 10a and dispenser 42 are interconnected by removably engaging and interconnecting the first coupling end 14a with an outlet region 44 of the dispenser 42. According to the preferred embodiment, the first coupling end 14a is inserted over an outlet tube 46 which has a diameter smaller than the diameter of the first coupling end 14a. The tip 45 of the outlet tube 46 releasably interconnects with end region 47 of the central portion 43 of the duster extension tube 10a. A dust dispenser 42 and a series of two or more flexible duster extension tubes 10a, 10b therefore can be interconnected to dispense dust at a greater distance. Thus, the first coupling end 14b of flexible duster extension tube 10b can be inserted over the smaller diameter second dispensing end 16a of flexible duster extension tube 10a, to further extend the reach of the dispenser.

After dispensing dust using the flexible extension tube system, the flexible duster extension tube 10a is removed from the outlet region 44 of the dust dispenser 42 and the plurality of flexible duster extension tubes 10a, 10b are disconnected from one another. The individual flexible duster extension tubes 10a, 10b are then cleaned using the tube cleaner 20, as shown in FIG. 3.

The extension tube to be cleaned is positioned with its second end 16 over a dust recovery container 30, typically the original dust particulate container. The extension tube cleaner 20 is inserted into the first coupling end 14 of the flexible duster extension tube 10 and is moved toward the second dispensing end 16, so that the cleaning element 22 will contact the inside surface 34 of the extension tube 10 and expel any remaining dust particulates 32 into the recovery container 30. After the dust particulates have been properly disposed of in the recovery container 30, the extension tube system can be reconnected and safely used again with a different type of pesticide dust.

Accordingly, the present invention provides a modular, variable length, extension tube system which can be assembled to suit the particular needs of a current job at hand. After the required type of dust has been dispensed, the tubes can be removed, one by one, and cleaned to insure that any dust particulate remaining in the tube is properly and safely returned to a recovery container to be properly disposed of or re-used.

Modifications and substitutions by one of ordinary skill in the art are considered to be within the scope of the present invention which is not to be limited except by the claims which follow.

What is claimed is:

1. A method of using an extension tube system for a dust particulate dispenser, comprising:
   interconnecting a first end of at least one flexible duster extension tube with an outlet region of said dust particulate dispenser;
   dispensing dust particulates through said flexible duster extension tube;

removing said first end of said at least one flexible duster extension tube from said outlet region of said dust particulate dispenser;

inserting an extension tube cleaner into said first end of said at least one flexible duster extension tube; and moving said extension tube cleaner from said first end toward a second end of said flexible duster extension tube to expel remaining dust particulates from said flexible duster extension tube into a dust particulate container which originally held said remaining dust particulates.

2. The method of claim 1, further including:

interconnecting a plurality of flexible duster extension tubes in series prior to dispensing said dust particulates, said step of interconnecting a plurality of flexible duster extension tubes including the step of serially interconnecting a first end of at least one additional flexible duster extension tube to said second end of said at least one flexible duster extension tube attached to said outlet region of said dust particulate dispenser and dispensing dust particulates through said plurality of flexible duster extension tubes;

removing said at least one additional flexible duster extension tube from said second end of said at least one flexible duster extension tube;

sequentially inserting said extension tube cleaner into said first end of each of said plurality of flexible duster extension tubes; and moving said tube cleaner from said first end of each said plurality of flexible duster extension tubes toward a second end of each of said plurality of flexible duster extension tubes to expel remaining dust particulates.

* * * * *